(12) United States Patent   (10) Patent No.: US 6,629,719 B2
Sims                        (45) Date of Patent:    Oct. 7, 2003

(54) TOP STACK MECHANISM FOR A CONVERTIBLE ROOF

(75) Inventor: William Sims, Lincoln Park, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/965,109

(22) Filed: Sep. 26, 2001

(65) Prior Publication Data

US 2003/0057728 A1 Mar. 27, 2003

(51) Int. Cl.$^7$ .................................................. B60J 7/00
(52) U.S. Cl. .................. 296/109; 296/115; 296/107.08; 296/107.09
(58) Field of Search ........................ 296/107.01, 114, 296/115, 121, 109, 108, 107.08, 107.09, 107.16

(56) References Cited

U.S. PATENT DOCUMENTS

| | | | |
|---|---|---|---|
| 2,747,928 A | * 5/1956 | Olivier et al. .......... 296/107.08 |
| 2,833,593 A | 5/1958 | Olivier et al. |
| 2,997,337 A | 8/1961 | Day et al. |
| 3,053,567 A | * 9/1962 | Geiger .................. 296/107.08 |
| 4,852,935 A | 8/1989 | Varner |
| 5,042,868 A | * 8/1991 | Nothaft et al. ......... 296/107.09 |
| 5,067,768 A | * 11/1991 | Fischbach ............. 296/107.08 |
| 5,161,852 A | 11/1992 | Alexander et al. |
| 5,295,722 A | * 3/1994 | Bonne et al. ................ 296/121 |
| 5,620,226 A | 4/1997 | Sautter, Jr. |
| 5,772,274 A | 6/1998 | Tokarz |
| 5,903,119 A | 5/1999 | Laurain et al. |
| 5,998,948 A | 12/1999 | Lange et al. |
| 6,039,382 A | 3/2000 | Mather et al. |
| 6,048,021 A | 4/2000 | Sautter, Jr. |
| 6,053,559 A | * 4/2000 | Haberl et al. ........... 296/107.09 |
| 6,095,589 A | * 8/2000 | Kinnanen et al. ...... 296/107.09 |
| 6,186,577 B1 | * 2/2001 | Guckel et al. .......... 296/107.07 |
| 6,193,300 B1 | * 2/2001 | Nakatomi et al. ..... 296/107.08 |
| 6,299,233 B1 | 10/2001 | Mentink |
| 6,322,130 B1 | * 11/2001 | Wanden et al. ........ 296/107.01 |
| 6,347,827 B1 | * 2/2002 | Maass ................... 296/107.09 |
| 6,416,111 B1 | * 7/2002 | Neubrand ............. 296/107.09 |
| 6,419,296 B2 | * 7/2002 | Dintner et al. ......... 296/107.18 |

* cited by examiner

*Primary Examiner*—Dennis H. Pedder
*Assistant Examiner*—Patricia L. Engle
(74) *Attorney, Agent, or Firm*—Harness, Dickey & Pierce, P.L.C.

(57) ABSTRACT

A convertible roof employs a top stack mechanism and a generally rigid roof cover. Furthermore, the frame may be stowed under a rigid roof cover. In another aspect of the present invention, the top stack mechanism employs a rearmost roof bow that is moved from above a roof cover to allow the roof cover to open, and then the entire top stack mechanism retracts into a storage area. A further aspect of the present invention provides a lost motion coupling of the top stack mechanism to the vehicle body. In yet another aspect of the present invention, a fluid powered actuator controls movement of the rearmost roof bow relative to the remainder of the top stack mechanism.

41 Claims, 15 Drawing Sheets

TOP STACK MECHANISM FOR A CONVERTIBLE ROOF

BACKGROUND AND SUMMARY OF THE INVENTION

The present invention relates generally to automotive vehicle roofs and more particularly to a convertible top stack mechanism used in an automotive vehicle.

Many automotive vehicles have a convertible top or roof that has a pliable fabric covering stretched over an underlying frame. Often these convertible tops include a number one roof bow which, when the convertible top is in the fully closed position, is removably fastened to the front windshield header of the automotive vehicle. The convertible top frames also generally include number two, three and four roof bows, and optionally a number five roof bow. Each of the bows are pivotally affixed to linkages that are pivotally affixed to each other to allow the convertible top to move from the fully opened to the fully closed position. These frames are commonly known as top stack mechanisms.

Some traditional convertible tops are operated by electric motors that drive gears adjacent rear rail portions that are coupled to the vehicle body. One such example is U.S. Pat. No. 5,772,274, entitled "Motorized Drive System for a Convertible Roof of an Automotive Vehicle," which issued to Tokarz on Jun. 30, 1998; this patent is incorporated by reference herein. When various conventional convertible tops are in the fully opened position, a soft or rigid roof cover may be placed over the stowed convertible top.

It is often difficult to package traditional top stack mechanism systems which include a rigid roof cover that will open and allow the convertible top to be stowed below the roof cover. A convertible top with a moveable five bow is particularly difficult to move below the roof cover and out of the way. Also, simultaneously moving the five bow out of the way while moving the roof cover can be difficult. Furthermore, some traditional rigid roof covers are not able to move into a fully flush position with the rest of the vehicle body when the top is retracted and the roof cover is closed. In particular, when the convertible top is in the fully opened position, a closed roof cover usually rests on top of the still upwardly angled (toward the rear of the vehicle) and partially projecting convertible top thereby not allowing a flush or aesthetically pleasing closed roof cover and often requiring a soft rather than rigid roof cover. One such example is U.S. Pat. No. 5,161,853 entitled "Convertible Top with Improved Geometry," which issued to Alexander et al. on Nov. 19, 1992; this patent is incorporated by reference herein.

In accordance with the present invention, the roof cover closes generally flush with the remainder of the adjacent body panels of the vehicle. A convertible roof employs a top stack mechanism and a generally rigid roof cover. Furthermore, the frame may be stowed under a rigid roof cover. In another aspect of the present invention, the top stack mechanism employs a rearmost roof bow which is moved from above a roof cover to allow the roof cover to open, and then the entire top stack mechanism retracts into a storage area. A further aspect of the present invention provides a lost motion coupling of the top stack mechanism to the vehicle body. In yet another aspect of the present invention, a fluid powered actuator controls movement of the rearmost roof bow relative to the remainder of the top stack mechanism.

The top stack mechanism of the present invention is advantageous over conventional systems since the rearmost roof bow of the present invention can be moved independently of the other bows of the convertible top. The fluid powered actuator allows for independent movement of the rearmost roof bow. In addition, the fluid powered actuator provides enough force to hold the rearmost roof bow in position at any point in its movement. Therefore, the fluid powered actuator does not need to be assisted by latches to hold the rear most roof bow in over the roof cover when the top stack mechanism is in the closed position, unlike many electric motor actuators. Also, the fluid powered actuator allows for a smaller mechanism as opposed to other systems. The roof cover is moved out of the way before the convertible top is retracted into the roof storage area. Additionally, the top stack mechanism is stowed past horizontal to allow the rigid roof cover to rest flush with the remainder of the body of the vehicle for a smooth and generally uninterrupted appearance of the exterior of the vehicle. Rather than simply rotating, a portion of the top stack mechanism also slides horizontally and vertically thereby moving the top stack mechanism below a horizontal plane. Therefore, the roof cover may rest evenly with the rearmost section (when stowed) of the body panels without disrupting the exterior lines of the automotive vehicle body. These and other advantages and benefits of the present invention will become apparent from the following description taken in conjunction with the accompanying drawings and claims.

DETAILED DESCRIPTION OF THE PREFERRED EMBODIMENT

Figure 1:
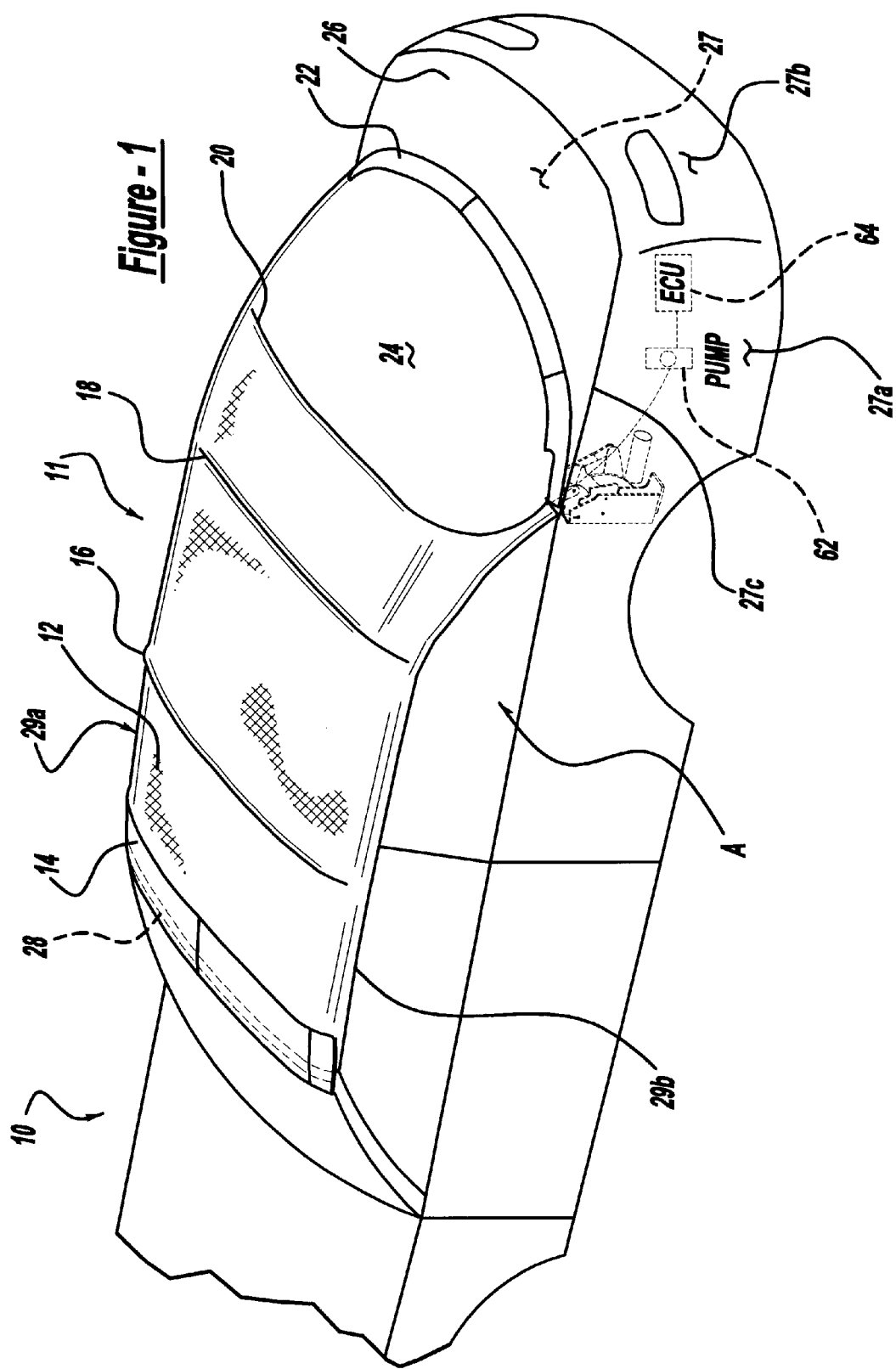
FIG. 1 is a perspective view showing an automotive vehicle employing the preferred embodiment of a convertible roof of the present invention with a top stack mechanism disposed in a fully closed position.
Figure 2:
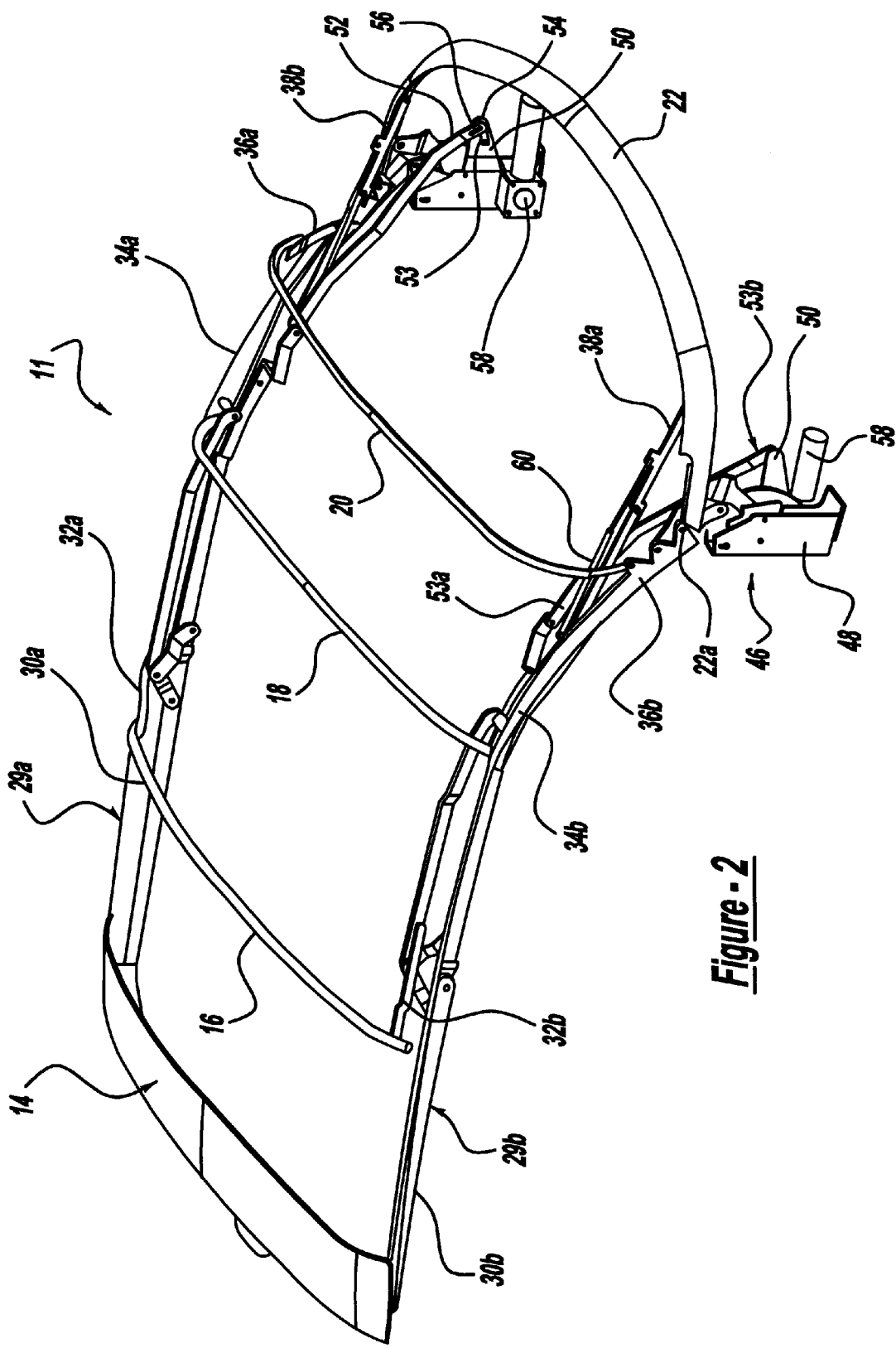
FIG. 2 is a perspective view showing the preferred embodiment convertible roof top stack mechanism disposed in a fully closed position.

Referring to FIGS. 1 and 2, an automotive vehicle 10 includes a soft top convertible roof that includes a top stack mechanism 11 with a pliable fabric cover 12. The top stack mechanism 11 of the convertible top includes a number one roof bow 14, a number two roof bow 16, a number three roof bow 18, a number four roof bow 20, and a number five roof bow 22. The convertible roof also includes a window or backlite 24. Five roof bow 22 is the rearmost roof bow and interconnects with the remainder of the top stack mechanism 11 generally at a pivot point 22a. A rigid metal trunk or deck lid acts as a roof cover 26 which will cover the convertible roof when stowed in a roof storage area 27, which in the preferred embodiment is a trunk. Roof cover 26 is automatically moveable by energization of an electric motor or hydraulic actuator and a gooseneck style hinge or the like. Roof cover 26 may also be a tonneau cover as the design of the automotive vehicle so requires. Rear quarter panels 27a and a rear tail panel 27b of automotive vehicle 10 also bound storage area 27. The upper rim 27c of storage area 27 is planar with a belt line A of the automotive vehicle. Top stack 11 is stowed below roof cover 26 when it is in the fully opened or retracted position. When convertible top stack mechanism 11 is in the fully closed or raised position, number one bow 14 engages and latches to a header panel 28 of vehicle 10.

Figure 5:
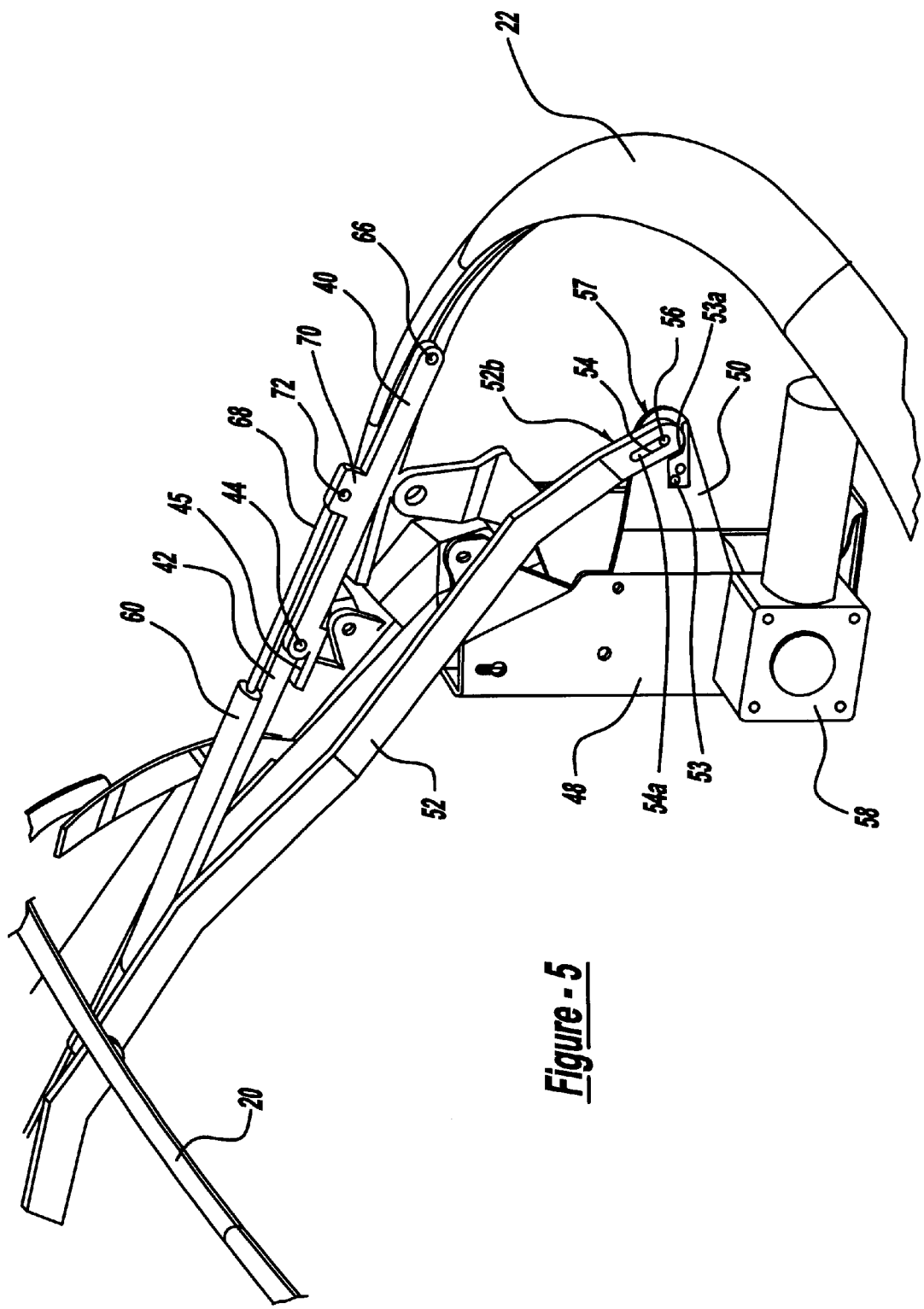
FIG. 5 is an enlarged perspective view taken along line 5—5 of FIG. 4.
Figure 6:
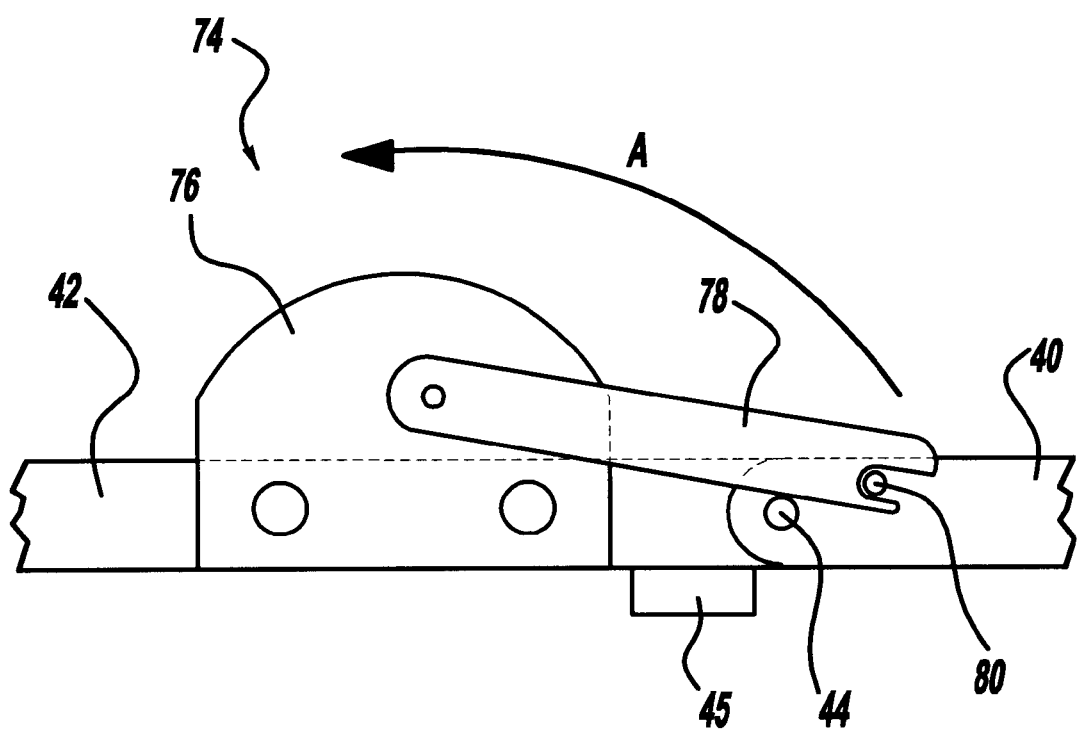
FIG. 6 is an enlarged side elevational view taken within circle 6—6 of FIG. 4.

Each of the roof bows are affixed to linkages which are pivotally interconnected to each other where each one of the pair of linkages interconnect to form rails 29a and 29b that are parallel to one another. The roof bows are installed transversely between rails 29a, 29b and provide additional support to top stack mechanism 11. Each roof bow, however, is connected to a particular set of linkages. Number one bow 14 is connected to a first pair of linkages 30a and 30b. Number two roof bow 16 is connected to a second pair of linkages 32a and 32b. Number three roof bow 18 is connected to third pair of linkages 34a and 34b. Number four roof bow 20 is connected to a fourth pair of linkages 36a and 36b and finally number five roof bow 22 is pivotally interconnected to the same linkages as number four roof bow 20. A fifth pair of linkages 38a and 38b also pivotally interconnects number five roof bow 22 to a second region of the fourth pair of linkages 36a and 36b. With reference to FIG. 5, five roof bow 22 is pivotally interconnected with linkage 38a which includes a first member 40 and a second member 42 interconnected with a pivot pin 44 through a pivot point. When the fifth pair of linkages 38a and 38b are fully extended, tab 45 acts as a stop to ensure that fifth pair of linkages 38a and 38b do not hyper extend. Therefore, fifth pair of linkages 38a and 38b achieve a full lineal extension and no more.

Figure 3:
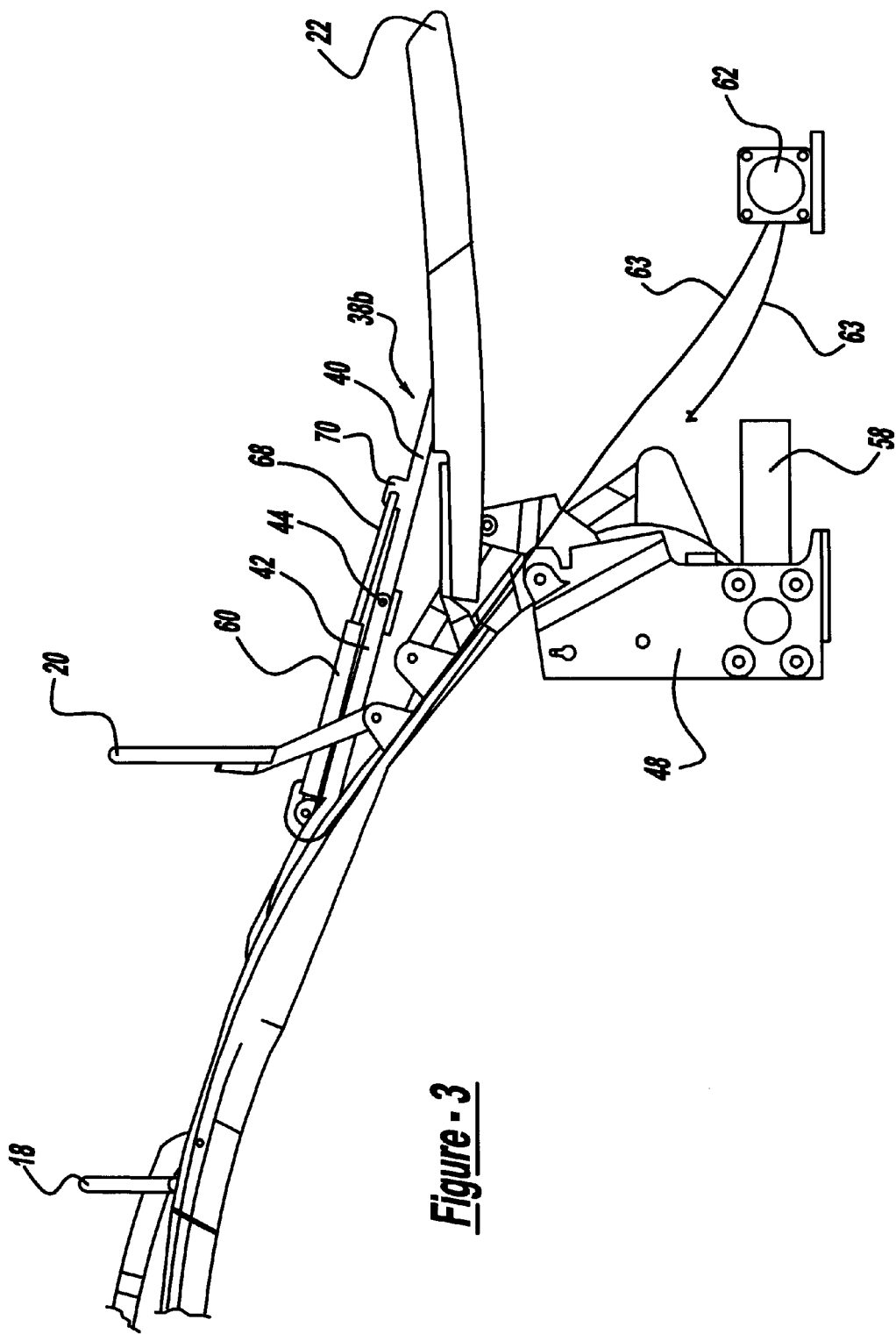
FIG. 3 is a fragmentary side elevational view showing the preferred embodiment convertible roof top stack mechanism disposed in the fully closed position.
Figure 4:
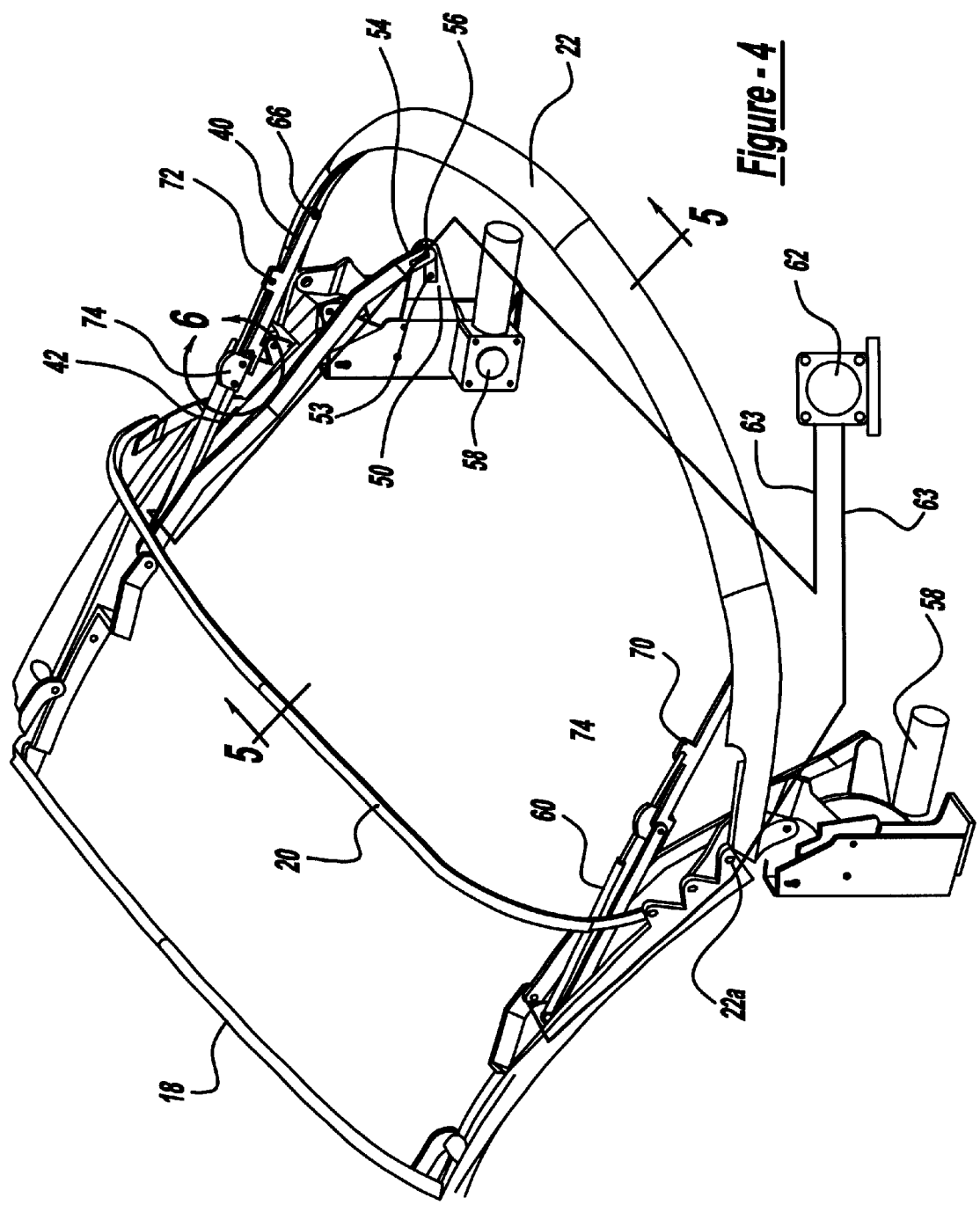
FIG. 4 is a fragmentary perspective view of the rear half showing the preferred embodiment convertible roof top stack mechanism disposed in a fully closed position.

With continuing reference to FIGS. 1 and 2 and further referencing FIGS. 3 and 4, all of the linkages interconnect and terminate in automotive vehicle 10 near storage area 27 in a gear interconnection area 46. In gear interconnection area 46, a stationary bracket 48 provides the base point for top stack mechanism 11 and affixes top stack mechanism 11 to vehicle 10.

Also, affixed to bracket 48 is a balance tab 50. Pivotally affixed to balance tabs 50 is a balance linkage 52 having a front end 52a and a rear end 52b. Front end 52a of balance linkage 52, is pivotally interconnected to third pair of linkages 34a and 34b of top stack mechanism 11. It is to be understood, however, this is only illustrative and balance linkage 52 may be alternately affixed to other positions of top stack mechanism 11. The exterior of rear end 52b also engages camming block 53 that includes camming surface 53a. Camming block 53 is permanently affixed to balance bracket 50. Rear end 52b of the balance linkage 52 includes an elongated bore or lost motion slot 54, that includes a forward end 54a and a rearward edge 54b. Slot 54 is generally defined by an oval formed in balance linkage 52 substantially in line with and between front end 52a and rear end 52b. Slot 54 receives a balance pin 56 that extends toward the inside of automotive vehicle 10 from balance tab 50. Therefore, not only may balance linkage 52 rotate about balance pin 56, but balance linkage 52 may also slide longitudinally on balance pin 56 because of slot 54. Furthermore, camming surface 53a assists in the motion of balance link 50, discussed herein.

An electric motor actuator 58 provides the automatic power for driving the gears of top stack mechanism 11. While electric motor 58 moves top stack mechanism 11 as a whole, fifth pair of linkages, 38a and 38b, for five roof bow 22, are automatically moved by a hydraulic cylinder 60 which is driven by an external pump 62, through hydraulic lines 63, and controlled by an electronic control unit (ECU) 64 such as a microprocessor. ECU 64 also controls activation of electric motor 58.

FIGS. 3–6 more clearly show fifth pair of linkages 38a and 38b and the mechanism to move five roof bow 22. Fifth pair of linkages 38a and 38b include a first member 40 which is pivotally interconnected with five roof bow 22. First member 40 connects through a pin 66 to five roof bow 22 which allows it to pivot when five roof bow 22 is moving. Second member 42 is pivotally interconnected to fourth pair of linkages 36a and 36b at a second pivot point. When the operator of automotive vehicle 10 actuates top stack mechanism 11 to retract or lower the convertible roof, pump 62 is automatically actuated to manipulate hydraulic cylinder 60. Hydraulic fluid is pumped through hydraulic lines 63 by pump 62 to contract hydraulic cylinder 60. A piston rod 68, extending from hydraulic cylinder 60, is pivotally interconnected with a tab 70 through a pin 72 so that as cylinder 60 contracts five roof bow 22 is retracted. More specifically, five roof bow 22 is rotated up and away from roof cover 26 towards four roof bow 20.

A switch 74 is coupled with fifth pair of linkages 38a and 38b near pivot point 44. Switch 74 includes a switch body 76 and a switch arm 78. Switch body 76 is affixed to second member 42 while switch arm 78 is pivotally interconnected to a switch pin 80 on first member 40. Pivot pin 44 allows first member 40 to be pivoted over second member 42 in the direction of Arrow A. As first member 40 is driven by hydraulic cylinder 60, first member 40 also moves switch pin 80 which engages and moves switch arm 78. As switch arm 78 is rotated in direction of Arrow A, a signal is sent to ECU 64. ECU 64 is able to determine the relative position of first member 40 to second member 42 of fifth pair of linkages 38a and 38b based upon the signal received from switch 74.

Figure 7:
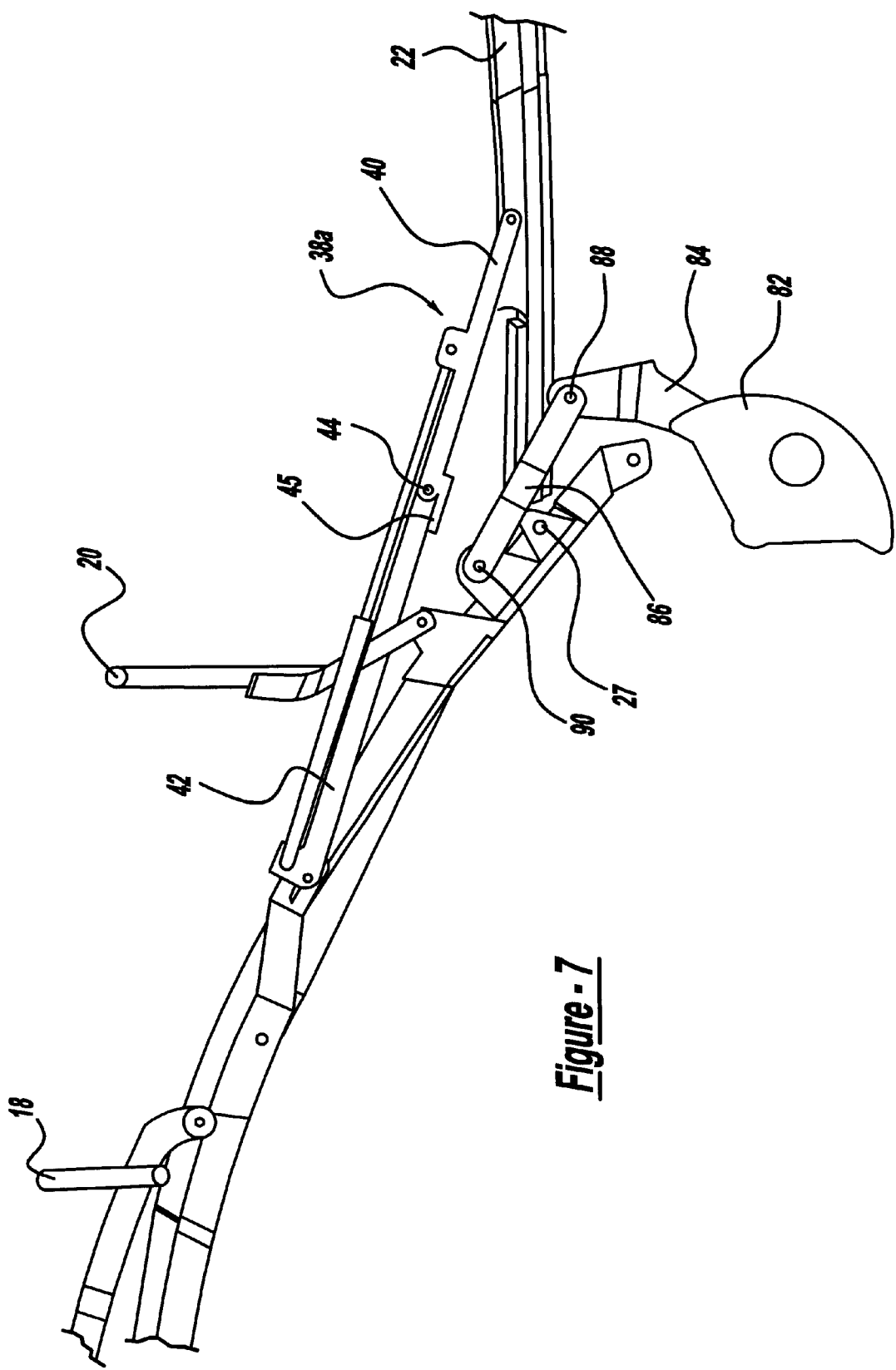
FIG. 7 is a fragmentary side elevational view showing the preferred embodiment convertible roof top stack mechanism disposed in the fully closed position.

In FIG. 7, bracket 48 of mounting area 46 has been removed for clarity. A circular sector gear 82 engages an output drive gear of electric motor 58 (illustrated in FIG. 2) to drive top stack mechanism 11 between a fully opened and a fully closed position. Sector gear 82 engages a first arm 84 which pivotally engages a third arm 86 through a pivot pin 88 to drive fourth pair of linkages 36a and 36b. In particular, second arm 86 engages a pivot pin 90 so that when sector gear 82 moves first arm 84, pivot pins 88 and 90 allow first arm 84 and second arm 86 to drive fourth pair of linkages 36a and 36b to begin the movement of top stack mechanism 11, including number one through four roof bows.

Figure 8:
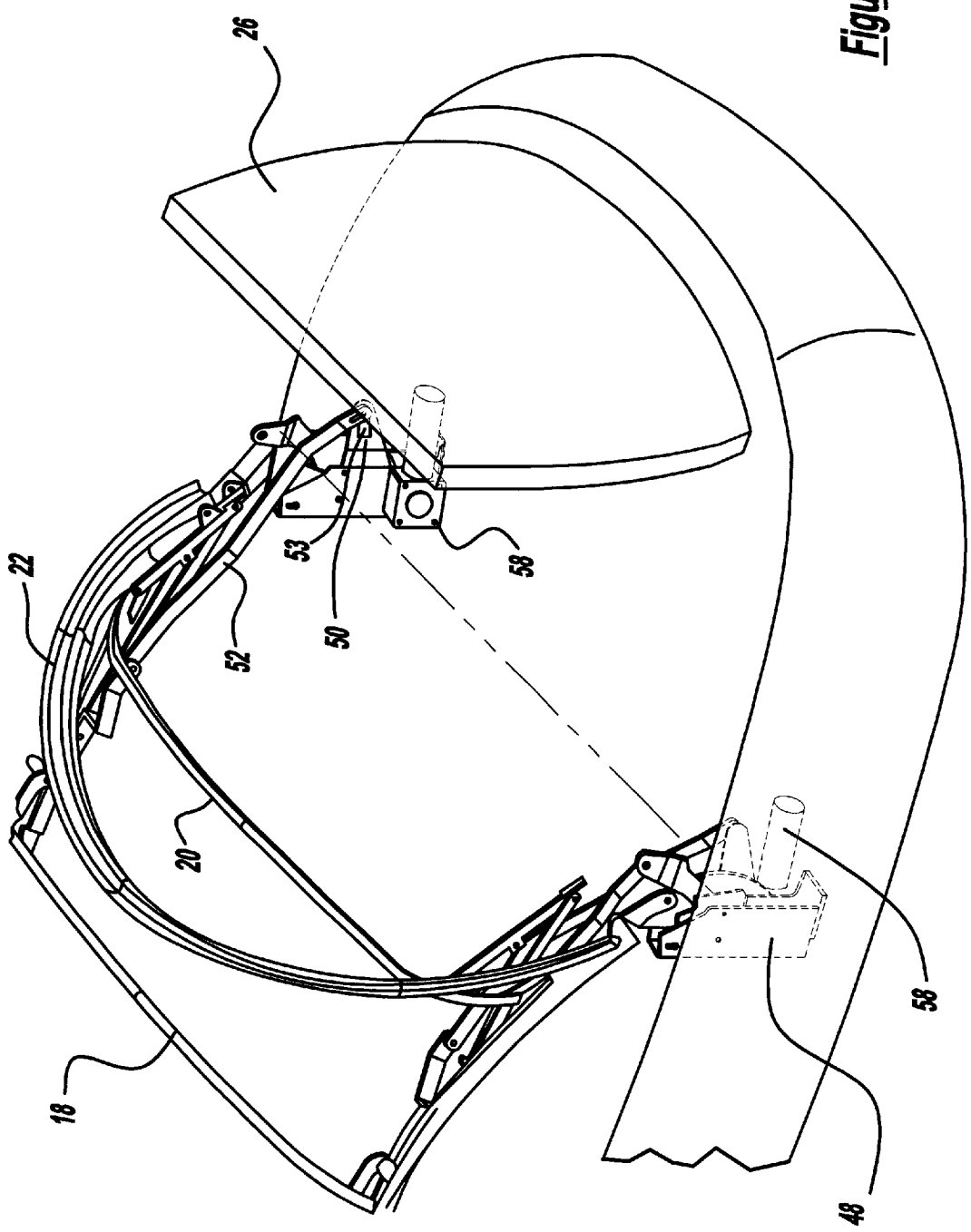
FIG. 8 is a fragmentary perspective view of the preferred embodiment of the convertible roof top stack mechanism showing a five bow disposed in a raised position and a roof cover disposed in an open position.
Figure 9:
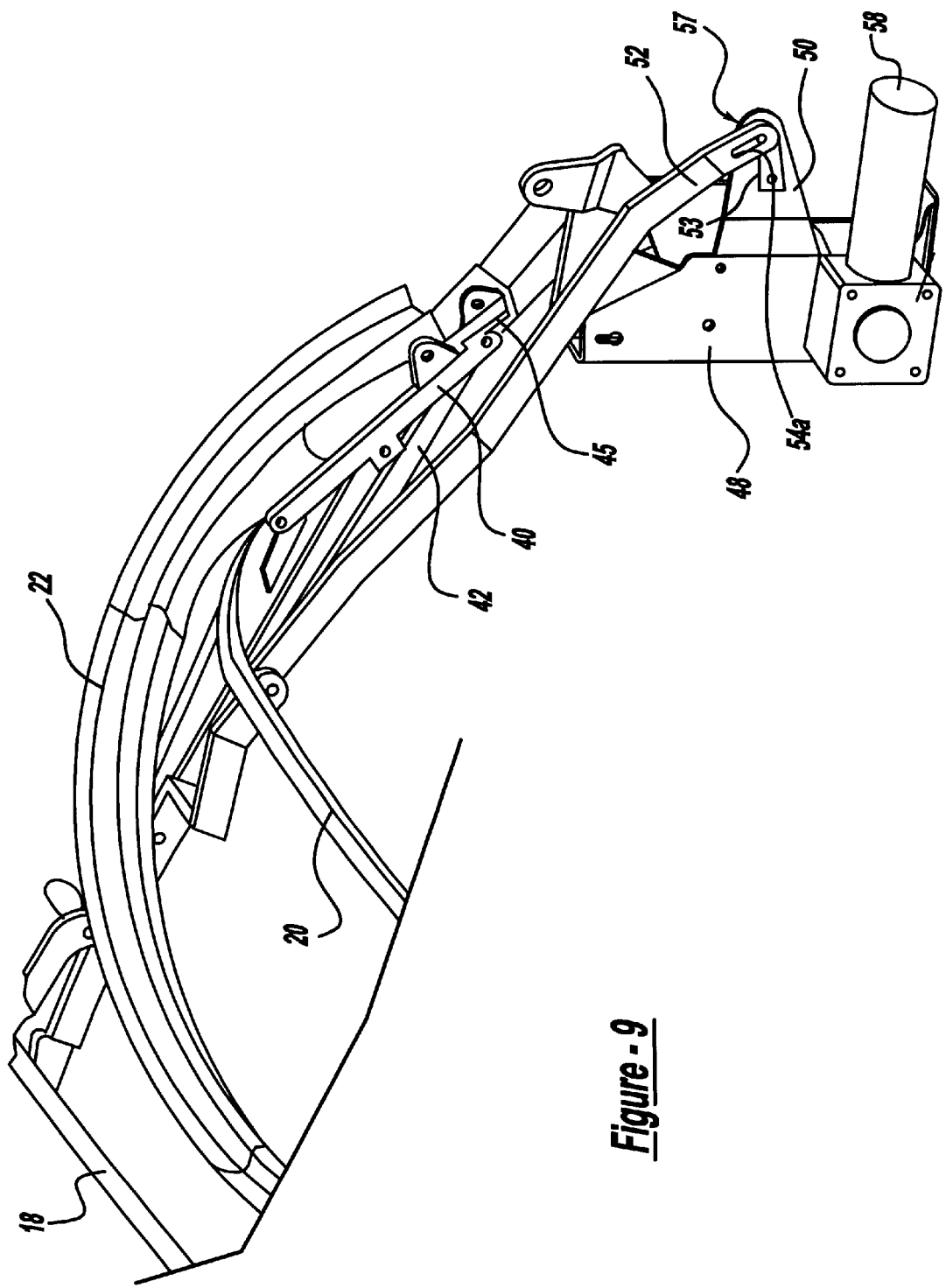
FIG. 9 is a fragmentary rear perspective view of the preferred embodiment of the convertible roof top stack mechanism in a partially open position.
Figure 10:
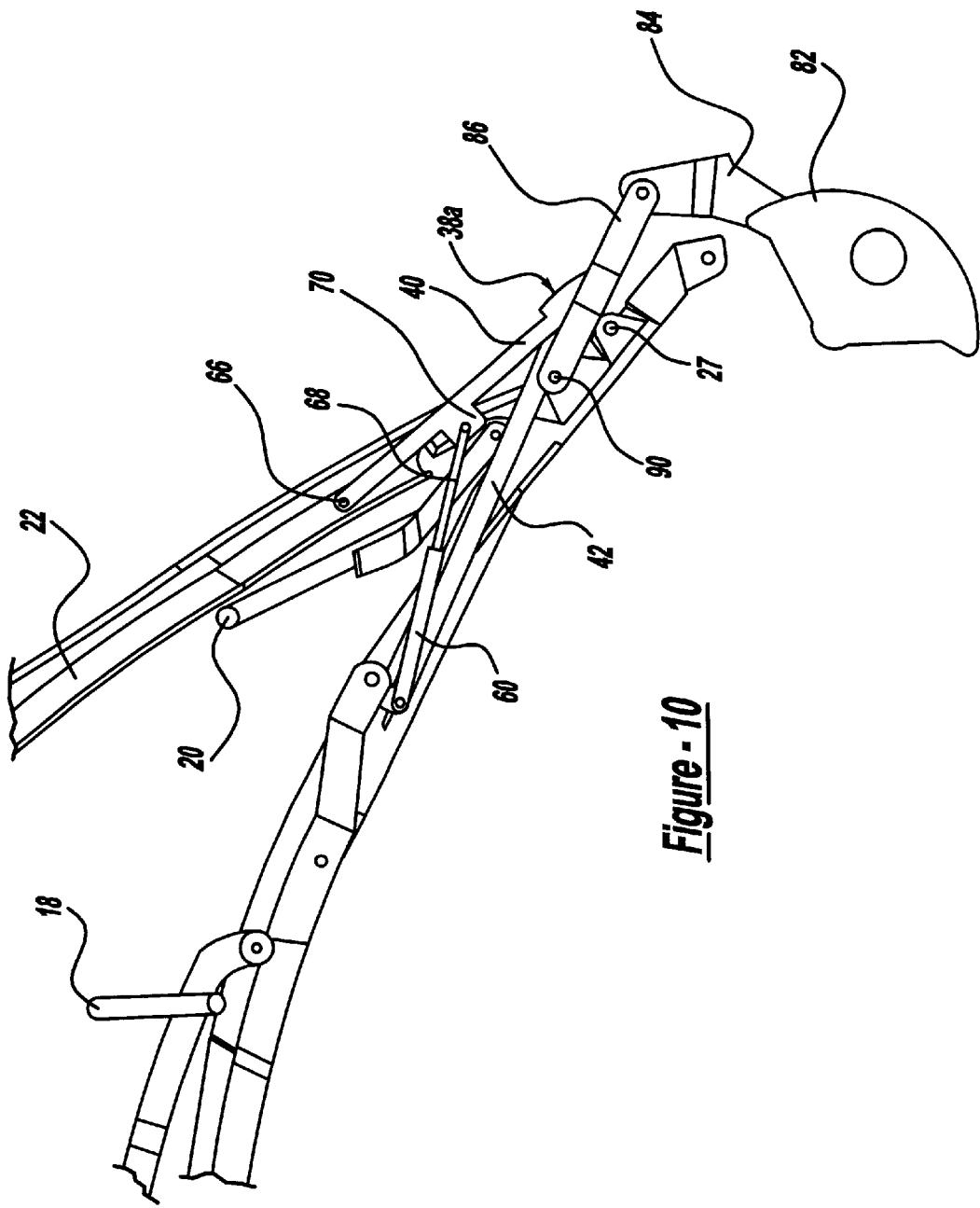
FIG. 10 is a fragmentary side elevational view showing the preferred embodiment convertible roof top stack mechanism disposed in a partially open position.

The process of opening or retracting convertible top stack mechanism 11 will now be discussed. The complete opening of top stack mechanism 11 requires placement of top stack mechanism 11 below roof cover 26. As shown in FIG. 1, five roof bow 22, however, overlays roof cover 26 when top stack mechanism 11 is in the fully closed position. Therefore, five roof bow 22 must be moved to open roof cover 26. Referring to FIGS. 8 through 10, five roof bow 22 is first collapsed against the remainder of the fully closed top stack mechanism 11 so that roof cover 26 may be opened. Five roof bow 22 is automatically pivoted and rotated to attain a more generally vertical position. In particular, the rearmost portion of five roof bow 22 rotates about a pivot point 22a. The initial movement of five roof bow 22 toward the vertical position is initiated and carried out by the fluid power of hydraulic cylinder 60. Hydraulic cylinder 60 is actuated to draw first member 40 of fifth pair of linkages 38a and 38b towards second member 42. ECU 64 senses that the operator of vehicle 10 desires to open top stack mechanism 11, therefore, pump 62 is signaled to contract the hydraulic cylinder 60. When hydraulic cylinder 60 is actuated, five roof bow 22 is drawn to a substantially vertical position before roof cover 26 is allowed to open. At a predetermined position, ECU 64 turns off pump 62 to stop motion of five roof bow 22. In this condition, five roof bow 22 is moved independently of the remainder of top stack mechanism 11. Hydraulic cylinder 60 provides enough force to hold five roof bow 22 over roof cover 26 without the assistance of other systems. Therefore, the actuation of the hydraulic cylinder alone moves five roof bow 22 to a generally vertical position near four roof bow 20. ECU 64 determines the location of the fifth pair of linkages 38a and 38b, and the proper time to stop the pump 62, through switch 74.

Figure 11:
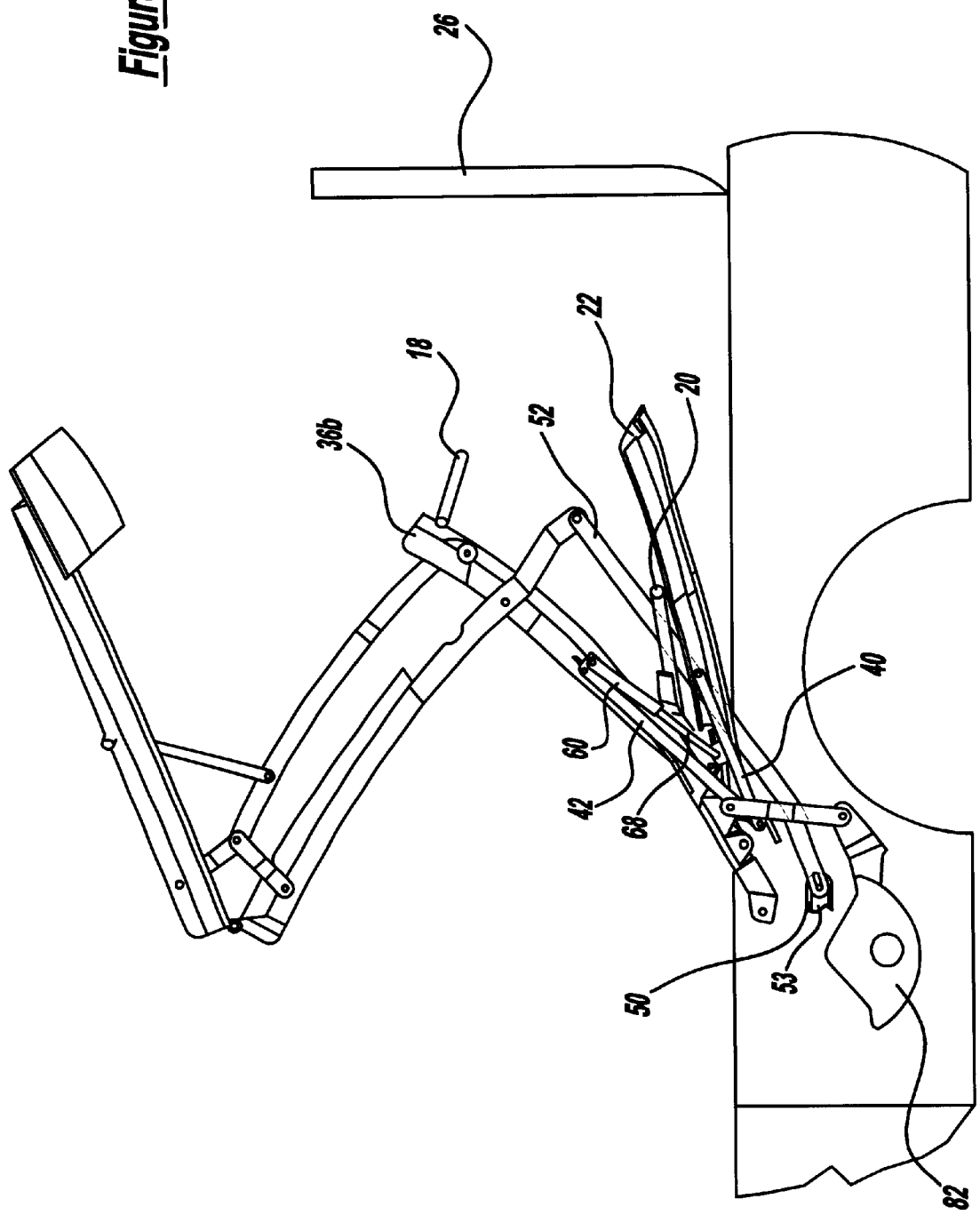
FIG. 11 is a side elevational view showing the rear portion of an automotive vehicle and the preferred embodiment convertible roof top stack mechanism disposed in a semi-open intermediate position.
Figure 12:
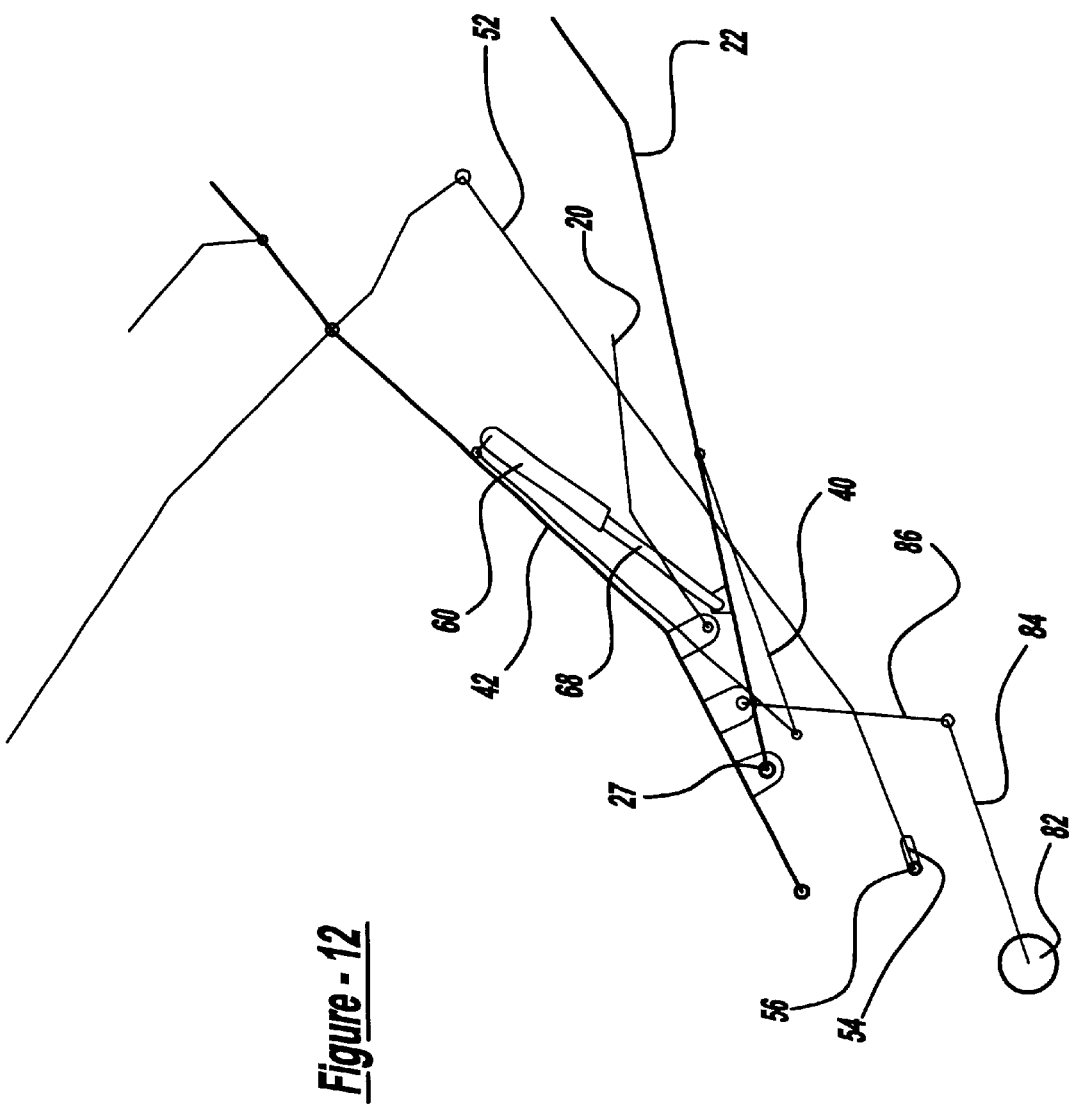
FIG. 12 is a diagrammatic view of the preferred embodiment convertible roof top stack mechanism disposal in a semi-open intermediate position.
Figure 13:
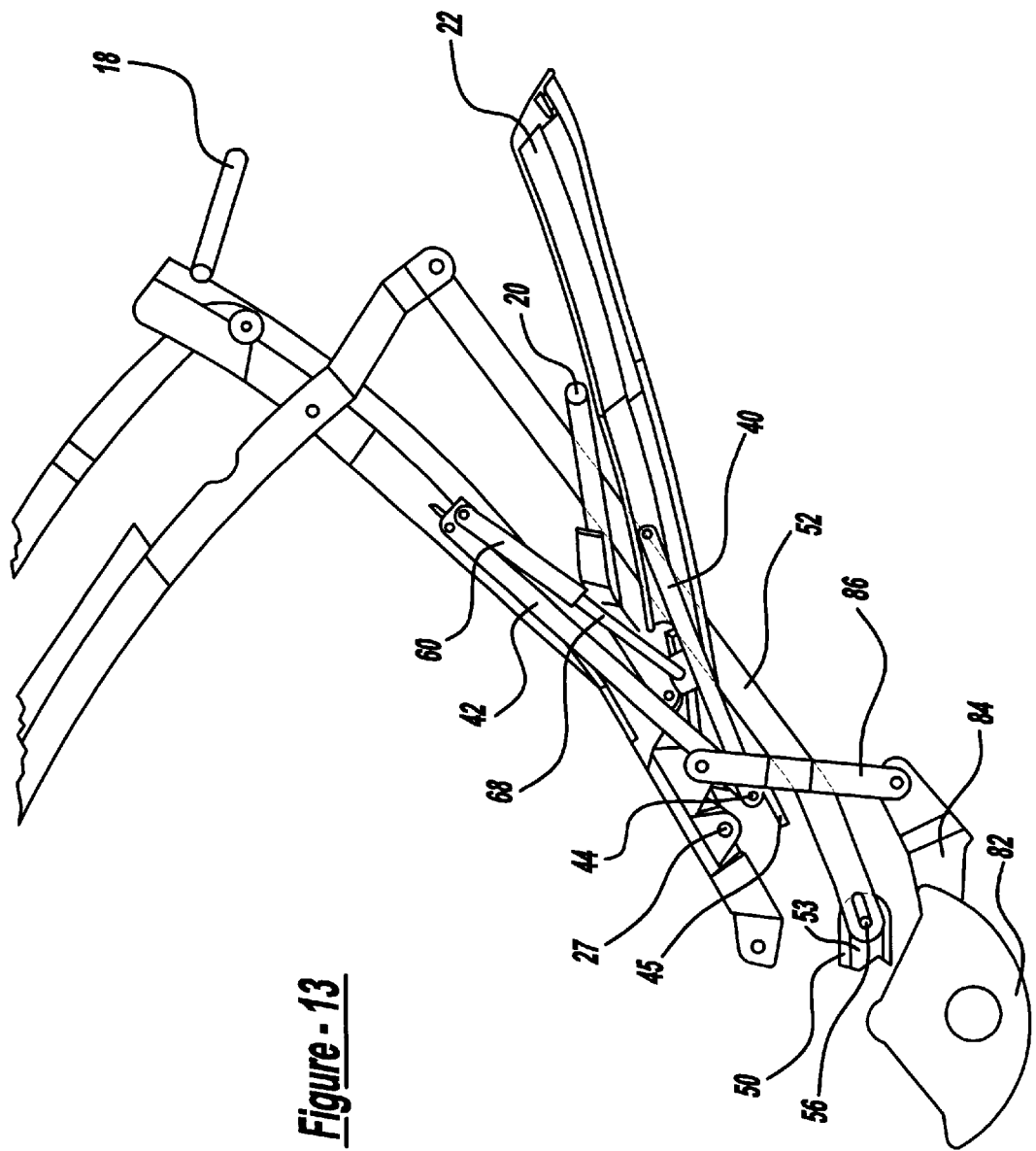
FIG. 13 is a fragmentary side elevational view showing the embodiment convertible roof disposed in a semi-open intermediate position.
Figure 14:
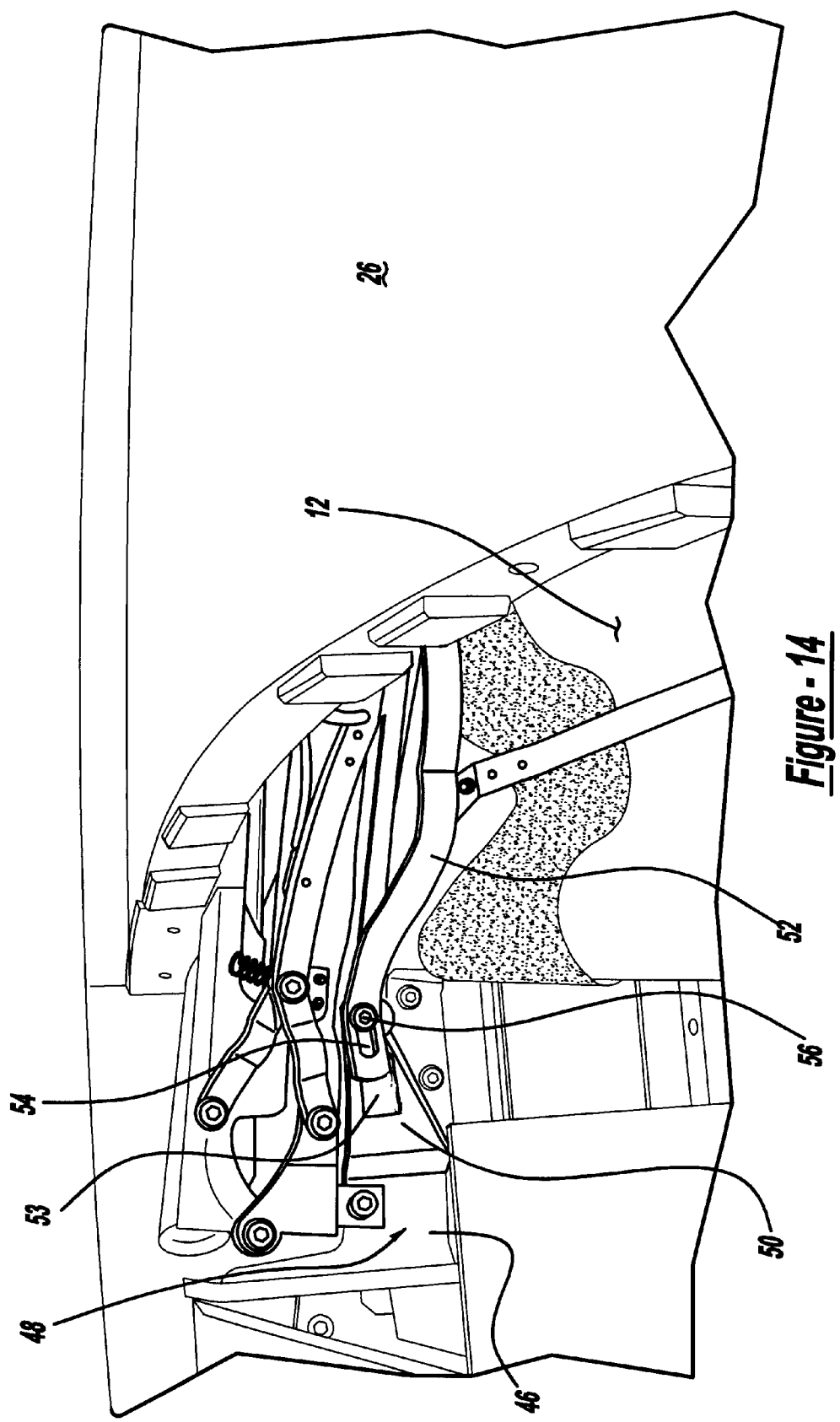
FIG. 14 is a fragmentary perspective view showing the preferred embodiment convertible roof top stack mechanism disposed in the fully opened position below the rigid roof cover.
Figure 15:
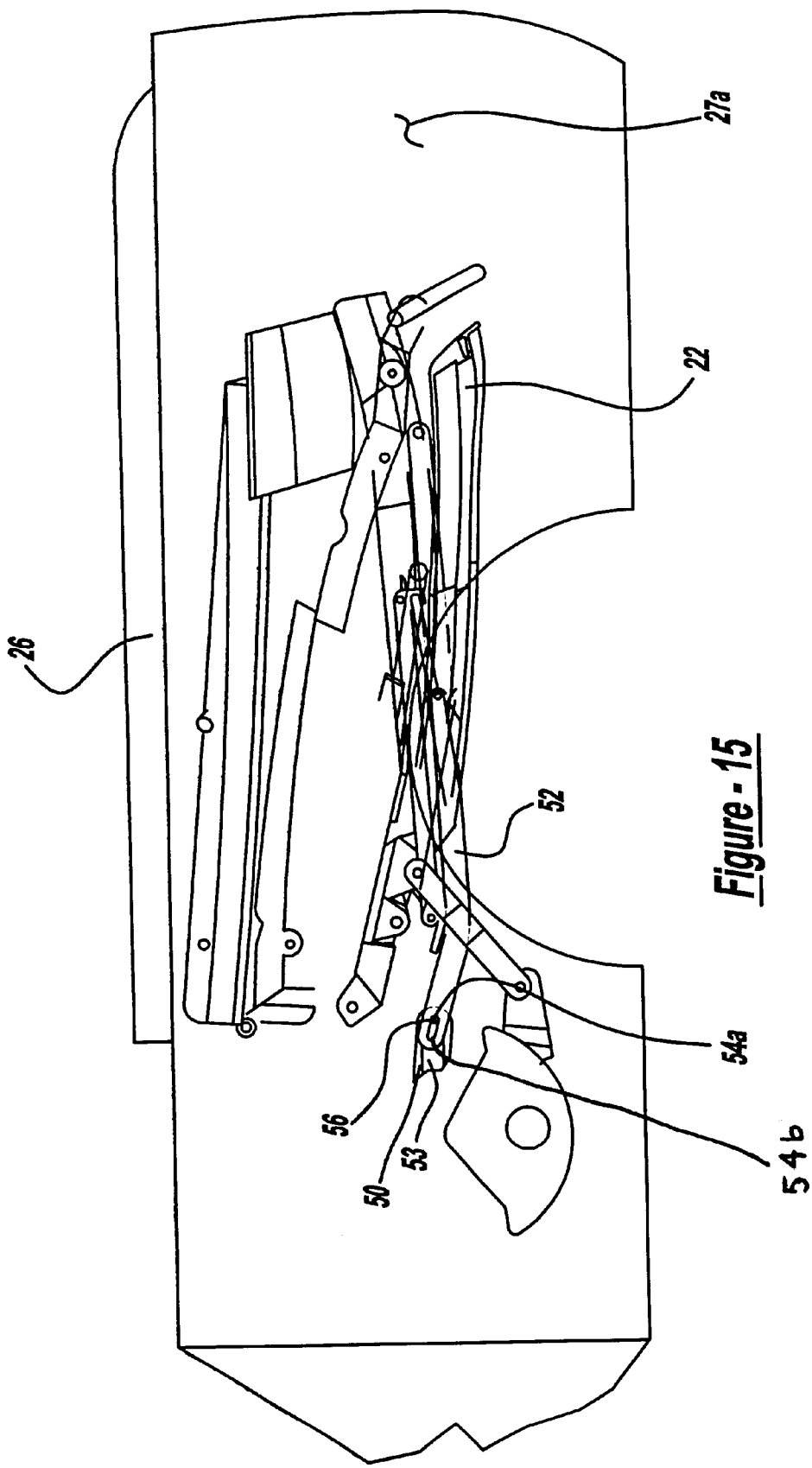
FIG. 15 is a fragmentary side elevational view of an automotive vehicle with the preferred embodiment of the convertible roof top stack mechanism disposed in a fully open position below the rigid roof cover.

ECU 64 energizes electric motor 58 once it has determined five roof bow 22 is in the proper position. Electric motor 58 then moves the entire top stack mechanism 11. Electric motor 58 drives sector gear 82. Sector gear 82 has splines which intersect with splines on the output gear driven by electric motor 58. Linkage 84 interconnects with linkage 86 which provides power to move the remaining linkages and roof bows of the top stack mechanism 11. Through the linkage interconnections, top stack mechanism 11 is drawn to a semi-collapsed orientation shown in FIG. 11 before it is retracted fully beneath roof cover 26. ECU 64 controls both hydraulic pump 62 and electric motor 58 to move the entire top stack mechanism 11 in a concerted action. Furthermore, hydraulic cylinder 60 is the mechanism to initially drive fifth pair of linkages 38a and 38b. Therefore, five roof bow 22 can rest over roof cover 26, when top stack mechanism 11 is in the closed position, without disturbing the ability of top stack mechanism 11 to be retracted below roof cover 26. When top stack mechanism 11 is in the fully closed position, fifth pair of linkages 38a and 38b are locked in place and held at a fully extended position by hydraulic cylinder 60 and tab 45, as previously discussed. It is to be noted that in the preferred embodiment of the present invention, five roof bow 22 is moved to the generally vertical position near four roof bow 20 solely by hydraulic cylinder 60. It is to be further understood that the operation, above described, is reversed to close top stack mechanism 11.

After five roof bow 22 has been raised generally vertical, the process of opening top stack mechanism 11 continues by bringing one roof bow 14 generally above storage area 27 before top stack mechanism is places in storage area 27. Certain portions of top stack mechanism 11 have been removed for clarity, including electric motor 58 and bracket 48. Once five roof bow 22 has been moved out of its resting position on roof cover 26, so that roof cover 26 may be opened, top stack mechanism 11 then begins its process of being fully opened and stowed below roof cover 26. Hydraulic cylinder 60 remains contracted to hold five roof bow 22 adjacent the fourth pair of linkages 36b. As sector gear 82 is driven by electric motor 58 (illustrated in FIG. 9), each of the linkages is drawn down while also carrying the associated roof bows therewith.

As the linkages however are drawn towards the fully opened position, balance linkage 52 both rotates and slides along pin 56 as top stack mechanism 11 is moved to the fully opened position. Slot 54 and pin 56 interact to form a rotation or pivot area 57 about which balance linkage 52 may move. Slot 54 in balance linkage 52 allows balance linkage 52 to have both rotational and longitudinal displacement movement relative to bracket 46. Therefore, once top stack mechanism 11 is nearly in the fully opened position, slot 54 allows balance linkage 52 to be moved below a plane horizontal to the rim 27c of storage area 27. When entire top stack mechanism 11 is placed below a horizontal line roof cover 26 is allowed to fully close over top stack mechanism 11. Before top stack mechanism 11 is in the fully opened position, pin 56 is closer to rear end 52b of balance linkage 52. As top stack mechanism 11 moves toward its fully opened position, pin 56 rides along slot 54 to engage the forward edge 54a of slot 54 in balance linkage 52. This allows top stack mechanism 11 to be fully concealed by roof cover 26 and for roof cover 26 to be moved to a position substantially flush with automotive vehicle body panels 27a. In one embodiment, the rearmost positions of top stack mechanism 11 in the fully opened position are below the forward most portions of top stack mechanism 11 in the fully opened position. This ensures that top stack mechanism 11 may be fully hidden or covered by roof cover 26. In another aspect, the linkages of top stack mechanism 11 are substantially at an angle below a plane parallel to belt line A of the automotive vehicle 10 or upper rim 27c. Therefore, slot 54 allows top stack mechanism 11 to be more fully moved below belt line A of the automotive vehicle 10. Additionally, the rearmost portion of five roof bow 22 is below pin 56 which engages balance linkage 52 when top stack mechanism 11 is in the fully opened position.

While the preferred embodiment of the top stack mechanism for a convertible roof has been disclosed, it should be appreciated that variations can be made which fall within the scope of the present invention. For example, a slot which performs substantially similar to slot 54 formed in balance linkage 52 may be placed in balance tab 50. A pin substantially similar to pin 56 extending from balance tab 50 may laterally extend from balance linkage 52. In this variation, the balance linkage would still be able to move both rotationally and longitudinally however the pin on the balance linkage would slide in a slot formed on the balance tab 50. This variation, however, would not differ from the scope of the present invention. Additionally, other linkages may include lost motion slots similar to lost motion slot 54 placed in balance linkage 52 also at an end that engages bracket 46. Furthermore, other actuators may be used in place of the hydraulic cylinder disclosed in the present invention to move five roof bow 22 to a substantially vertical position before moving roof cover 26, although some of the benefits of the present invention may not be achieved. Moreover, pneumatic fluid cylinder actuators can replace the hydraulic ones. Additional or fewer linkages can also be employed with the present invention top stack mechanism 11. An automatically moveable, rigid tonneau cover located above a separate roof storage compartment can alternately be provided in addition to a deck lid. Various materials, dimensions and angles have been disclosed but other materials, dimensions, and angles can be employed. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A convertible roof system for use in an automotive vehicle, the convertible roof system comprising:
   a top stack mechanism automatically movable between a fully closed position and a fully open position, the top stack mechanism including at least a first roof bow, a second roof bow and a linkage;
   a fluid powered actuator operatively interconnecting the second roof bow and the linkage, the fluid powered actuator including a fluid cylinder having opposite ends;
   selectively moving the second roof bow with the fluid powered actuator wherein the second roof bow pivots about a pivot area independent of the first roof bow to bring the second roof bow substantially adjacent the first roof bow; and
   a rigid roof storage space cover positionable over the top stack mechanism when the top stack mechanism is in the fully open position;
   both ends of the fluid cylinder moving with the top stack mechanism when the top stack mechanism moves between the fully closed and open positions.

2. The convertible roof system of claim 1, wherein the top stack mechanism includes at least five roof bows, wherein the second roof bow is a rearmost roof bow.

3. The convertible roof system of claim 2, wherein the linkage includes a rearwardly elongated arm and a forwardly elongated arm interconnected adjacent a substantial central pivot point, wherein the rearward arm pivotally interconnects with the second bow and the forward arm pivotally interconnects with the first bow.

4. The convertible roof system of claim 3 wherein, the fluid powered actuator operably interconnects the forwardly elongated arm and the rearwardly elongated arm over the substantially central pivot point to draw the rearwardly elongated arm towards the forwardly elongated arm to move the second roof bow.

5. The convertible roof system of claim 1, wherein fluid powered actuator includes a piston and a piston rod, wherein the piston rod is pivotally affixed to the linkage.

6. The convertible roof system of claim 5, further comprising an electronic control unit, the fluid powered actuator, being actuated by a hydraulic pump wherein the hydraulic pump is controlled by the electronic control unit which automatically controls the actuation of the hydraulic pump.

7. The convertible roof system of claim 1, further comprising an electric motor controlled by an electronic control unit, the electric motor operably driving the entire top stack mechanism between the fully open and the fully closed positions.

8. The convertible roof system of claim 1, further comprising
   a third roof bow, a fourth roof bow, and a fifth roof bow operably interconnected;
   a linkage system operably interconnecting each of the roof bows with one another, wherein the linkage system include rigid links that pivotally interconnect to form substantially parallel rails between which each of the roof bows are mounted;
   a hydraulic pump to hydraulically control the fluid powered actuator; and
   an electric motor to move the top stack once the second roof bow has been moved, wherein the electric motor drives the linkage system to move all the roof bows;
   operably actuating the hydraulic apparatus to initiate the movement of the top stack mechanism from the closed position to the open position before actuating the electric motor.

9. The convertible roof system of claim 1, wherein the top stack mechanism is covered by a soft fabric and the rigid roof cover is a trunk lid.

10. A convertible roof system for an automotive vehicle, the system comprising:
    a top stack assembly movable between a fully closed position and a fully open position, the top stack assembly including a balance link, a plurality of roof bows and a plurality of linkages, wherein the roof bows are transversely between and pivotally affixed to the plurality of linkages;
    an automatic actuator operable to drive the linkages between the fully open and the fully closed positions;
    a fixed bracket; and
    a projection extending from one of the bracket and the balance link, an elongated slot located on the other of the bracket and the balance link, the projection operably riding within the slot to allow the balance link to be automatically displaced both rotationally and longitudinally;
    the balance link having a first end located below a horizontal plane extending through the projection when the top stack mechanism is in the fully open position.

11. The convertible roof system of claim 10, wherein the balance link has a forward end and a rearward end, and the balance link includes the elongated slot which is defined by generally parallel sides.

12. The convertible roof system of claim 10, wherein the projection moves longitudinally in the elongated slot such that at least a majority of the top stack mechanism may also move longitudinally.

13. The convertible roof system of claim 10, further comprising a rigid roof cover, wherein the longitudinal movement of the balance link allows the top stack mechanism to be positioned below the rigid roof cover, and wherein the rigid roof cover is adapted to lie substantially flush with an automotive vehicle belt line.

14. The convertible roof system of claim 10, further comprising a first link and a second link, wherein a first portion of the automatic actuating mechanism is a hydraulic apparatus positioned between the first link and the second link to move a first of the roof bows relative to the remaining roof bows.

15. The convertible roof system of claim 14, wherein a second portion of the automatic actuating mechanism is an electric motor operatively driving the plurality of linkages to move the top stack mechanism between the fully closed and the fully open positions.

16. The convertible roof system of claim 15, further comprising an electronic control unit operable to selectively activate the hydraulic apparatus and the electric motor.

17. The convertible roof system of claim 10, further comprising a pliable fabric spanning between the roof bows.

18. An automotive vehicle comprising:
    a rigid roof cover;
    a bracket located generally below the roof cover;
    a convertible roof movable between a fully closed position and a stowed position, the convertible roof further comprising a rail;

an automatic drive system operatively interconnected to the rail to drive the convertible roof between the fully stowed and fully closed positions, and a linkage having a first end and a second end, the first end being pivotally coupled to the rail and the second end being movably coupled to the bracket, the second end of the linkage being displaced both rotationally and longitudinally when moved;

wherein the convertible roof is angled below the rigid roof cover when the convertible roof is in the stowed position.

19. The automotive vehicle of claim 18, wherein the second end of the linkage includes an elongated bore having a surface substantially elongated between the first end and the second end.

20. The automotive vehicle of claim 19, further comprising a member projecting from the bracket being moveable in the elongated bore such that the top stack mechanism is moveable longitudinally.

21. The automotive vehicle of claim 18, wherein the rigid roof cover is adapted to lie substantially flush with a belt line of the automotive vehicle, wherein the convertible roof is positionable below the rigid roof cover in a downwardly and rearwardly sloping angle.

22. The automotive vehicle of claim 21, further comprising multiple roof bows, wherein a first portion of the automatic drive system is a fluid powered actuator positioned on the rail to move a first of the roof bows relative to the remaining roof bows.

23. The automotive vehicle claim 22, wherein a second portion of the automatic drive system is an electric motor operatively interconnected to the rail to move the convertible roof between the fully closed and the fully stowed positions.

24. The automotive vehicle claim 18, further comprising an electronic control unit operable to selectively activate the automatic drive system which includes a hydraulic cylinder entirely movable with the convertible roof and an electric motor operably retracting the convertible roof.

25. The automotive vehicle claim 21, wherein the convertible roof includes a pliable fabric spanning between at least five roof bows.

26. A convertible roof system for an automotive vehicle, the system comprising:

a top stack mechanism, adapted to support a pliable cover, movable between a raised position and a stowed position, the top stack mechanism including side rails;

a plurality of roof bows spanning between the rails;

a balance link pivotally coupled to the rails, wherein the balance link allows a portion of at least a front one of the side rails to be stowed at a rearwardly and downwardly projected angle below a horizontal line at an automotive vehicle side belt line;

a first mechanism operable to automatically move the top stack mechanism between the raised position and the stowed position; and a fluid powered mechanism energizable to automatically move a first of the roof bows to a position closer to a second of the roof bows without requiring movement of the first roof bow.

27. The convertible roof system of claim 26, further comprising a stationary bracket and a lost motion coupling, the lost motion coupling connecting the balance link to the bracket.

28. The convertible roof system of claim 27, wherein the lost motion coupling includes a pin slideable within a slot, the slot being elongated and located adjacent an end of the balance link to allow both rotational and longitudinal movement of at least a portion of the balance link.

29. The convertible roof system of claim 26, further comprising an automatically moveable, rigid roof cover, wherein the top stack mechanism is stowable below the rigid roof cover.

30. The convertible roof system of claim 29, wherein the roof cover is a trunk lid.

31. The convertible roof system of claim 26, further comprising a first link pivotally connected to a second link, wherein the first link and the second link interconnect the first roof bow and the rails.

32. The convertible roof system of claim 31, wherein the fluid powered mechanism comprises is a piston affixed between the first linkage and the second linkage.

33. The convertible roof system of claim 26, wherein the first mechanism is an electric motor.

34. The convertible roof system of claim 33, further comprising:

a hydraulic pump operable to provide and remove fluid from the fluid powered actuator; and an electronic control unit operable to control the hydraulic pump and the electric motor.

35. A method of operating a convertible roof for an automotive vehicle, the convertible roof including at least a first roof bow, a second roof bow, and a piston mechanism, the method comprising:

(a) supplying fluid to the piston mechanism;

(b) moving at least a portion of the second roof bow toward the first roof bow in response to supplying the fluid to the piston mechanism;

(c) maintaining the first roof bow in a substantially stationary position during step (b); and (d) locating the entire piston mechanism above a belt line of the vehicle when the convertible roof is in its raised position.

36. The method of claim 35 further comprising, driving a linkage with the piston mechanism to cause the rotation of the second roof bow which is a rearmost roof bow, at least a portion of the linkage being located between the first roof bow and the rearmost roof bow.

37. The method of claim 35, further comprising:

(a) energizing an electromagnetic actuator;

(b) moving the first roof bow towards the rearmost roof bow in response to step (a), the rearmost roof bow being a number five roof bow; and (c) stowing the top stack mechanism in a fully opened position.

38. The method of claim 35, further comprising stowing the convertible roof below a rigid roof cover.

39. A method of operating a convertible roof system for an automotive vehicle having a belt line, the convertible roof system including a convertible soft top roof, a bracket, and a linkage, the method comprising:

(a) rotating the linkage relative to the bracket;

(b) moving the linkage below a horizontal plane substantially defined by the belt line;

(c) downwardly angling a rearmost section of the roof below the belt line when in a stowed position; and (d) stowing the entire roof below the horizontal plane.

40. The method of claim 39, further comprising moving the linkage in a longitudinal direction relative to the bracket.

41. The method of claim 39, further comprising:

(a) automatically closing a rigid roof cover above at least the rearmost section of the roof; and (b) downwardly and rearwardly angling at least one roof rail when fully retracted.

* * * * *

UNITED STATES PATENT AND TRADEMARK OFFICE
CERTIFICATE OF CORRECTION

PATENT NO.    : 6,629,719 B2
DATED         : October 7, 2003
INVENTOR(S)   : William Sims It is certified that error appears in the above-identified patent and that said Letters Patent is hereby corrected as shown below:

<u>Column 2,</u>
Line 53, after "position" delete "." and insert -- ; --.
Line 66, "disposal" should be -- disposed --.

<u>Column 6,</u>
Line 6, "places" should be -- placed --.

<u>Column 9,</u>
Lines 29, 34 and 39, after "vehicle" insert -- of --.

<u>Column 10,</u>
Line 12, after "comprises" delete "is".

Signed and Sealed this

Second Day of March, 2004

JON W. DUDAS
*Acting Director of the United States Patent and Trademark Office*